April 5, 1927.
W. H. BURRITT
VEHICLE WHEEL
Filed July 24, 1924
1,623,162
2 Sheets-Sheet 1
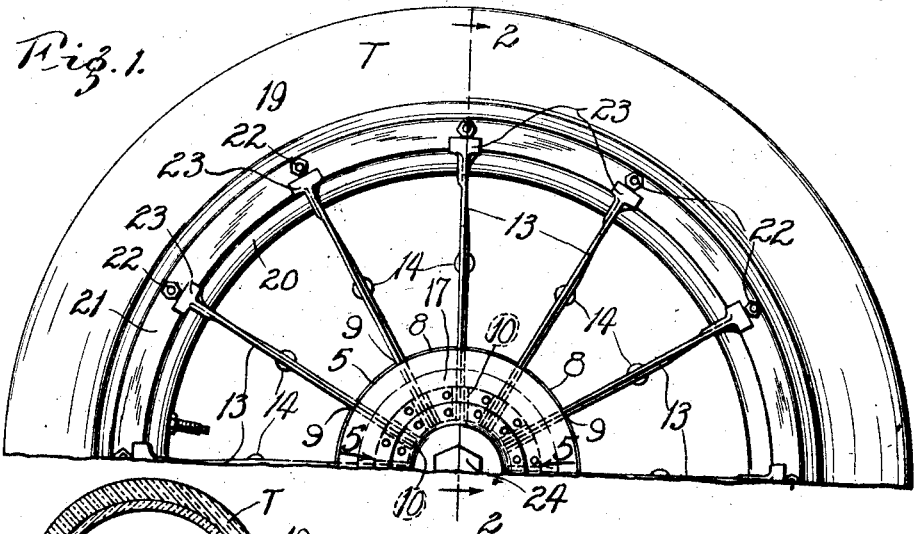
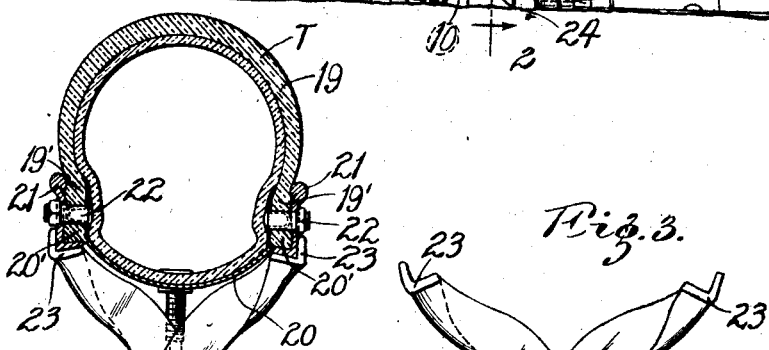
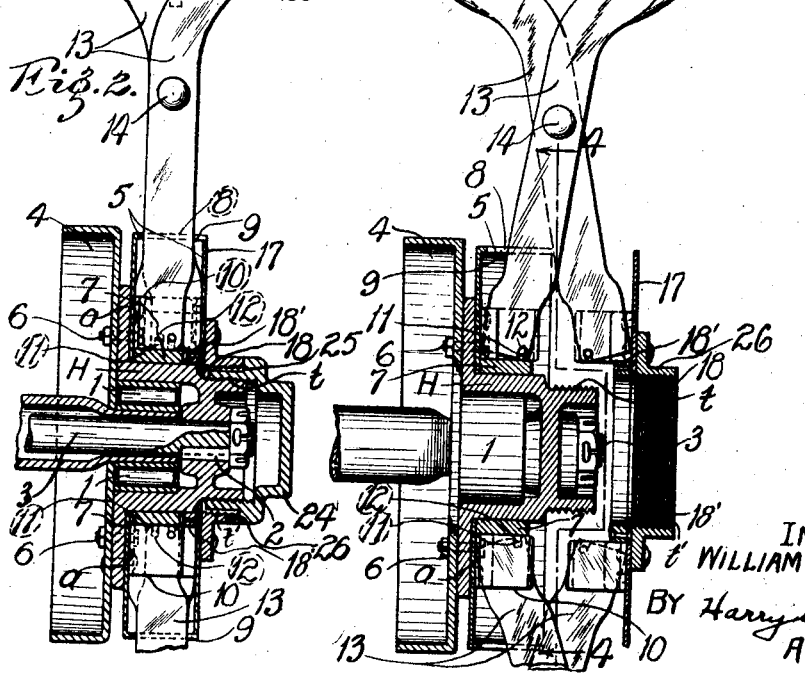
INVENTOR
WILLIAM H BURRITT
BY Harry A Benner
ATTORNEY April 5, 1927.  W. H. BURRITT  1,623,162
VEHICLE WHEEL
Filed July 24, 1924    2 Sheets-Sheet 2

INVENTOR
WILLIAM H. BURRITT
Harry A. Berner
ATTORNEY

Patented Apr. 5, 1927.

1,623,162

UNITED STATES PATENT OFFICE.

WILLIAM H. BURRITT, OF ST. LOUIS, MISSOURI.

VEHICLE WHEEL.

Application filed July 24, 1924. Serial No. 727,950.

My invention has relation to improvements in vehicle wheels, and consists in the novel features of construction more fully set forth in the specification and pointed out in the claims.

The present invention is more specifically an improvement over my Patent No. 1,162,749 dated Dec. 7, 1915, and has for its object the simplifying of the wheel construction, so that the pneumatic tire may be more readily removable than in the construction of my patent aforesaid. A further object is to provide a wheel construction that combines great strength with pleasing appearance, and one that is safe under the most trying conditions; that is to say, one that will remain rigid and safely support the weight of the car even when the tire is suddenly deflated. Tests have shown that the car may be driven at very high speed with the tire deflated, and without serious injury to the tire. In addition to these advantages the present invention also possesses those of my original Patent No. 1,162,749, in that the tire is of such shape and size that it may be operated with low air pressure (approximately 25 to 30 lbs.) thus providing easy riding qualities. Other advantages will be readily apparent from a detailed description of the invention in connection with the accompanying drawings, in which—

Figure 4:
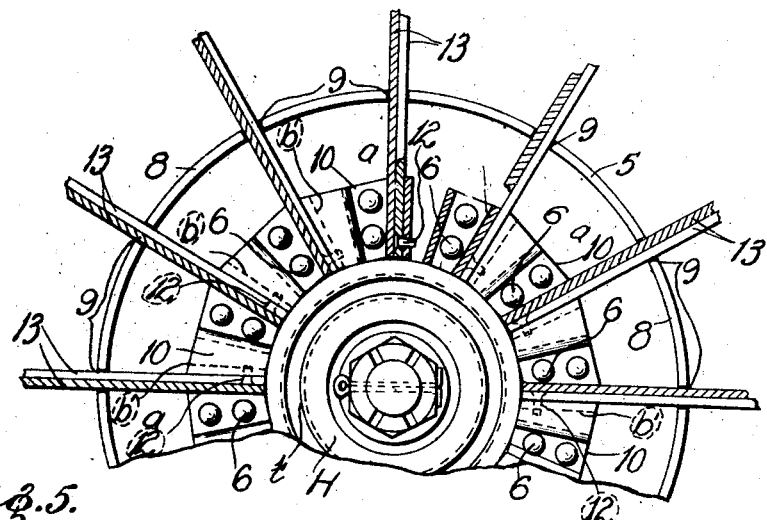
Figure 5:
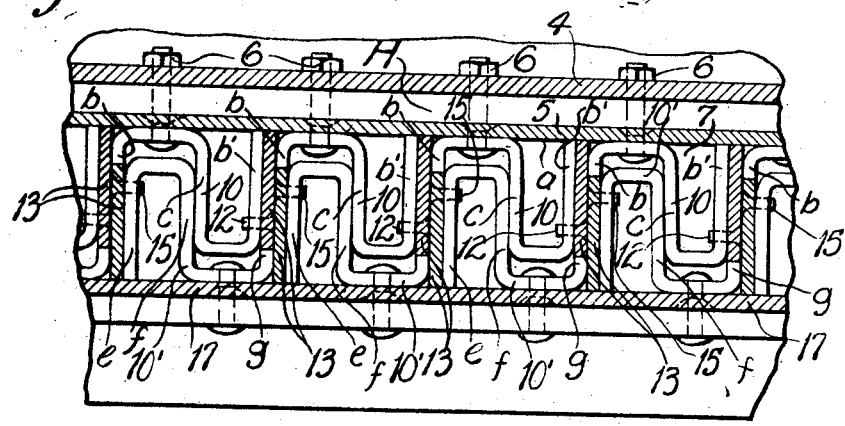
Figure 6:
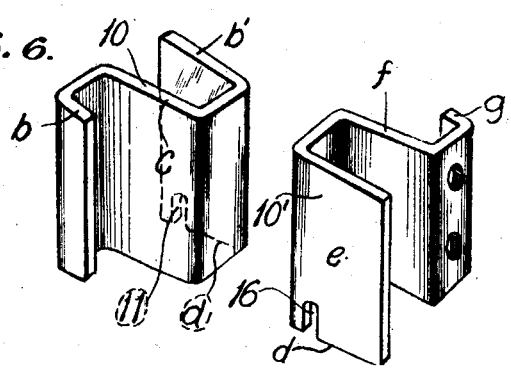

Figure 1 is a side elevation of one-half of my improved wheel; Fig. 2 is a vertical cross-section taken on the line 2—2 of Fig. 1; Fig. 3 is a view similar to Fig. 2 except that the spokes have been spread apart and the tire removed therefrom; Fig. 4 is a vertical longitudinal section taken on the line 4—4 of Fig. 3; Fig. 5 is a cross-sectional detail taken on the line 5—5 of Fig. 1; Fig. 6 is a perspective view of two of the interlocking formations between which the spokes are secured.

Referring to the drawings, H represents the wheel hub in which are the usual roller bearings 1 and driving spline 2 for connecting the axle 3 to the wheel. The brake drum 4 and spoke case 5 are secured to the hub H by bolts 6, 6, the spoke case having an inner marginal ring 7 which fits over the outer surface of the hub H, and a peripheral closure wall 8 which is provided with slots 9 to accommodate the wheel spokes, to be described more fully hereinafter. A series of spoke anchor brackets 10 are secured on the inner face $a$ of the spoke case 5 and are evenly spaced around the ring 7 and contiguous thereto there being as many brackets 10 as the wheel has spokes. The brackets 10 are substantially S-shaped, and have their outer walls $b$, $b'$ of uneven length, the wall $b$ being considerably shorter than $b'$, while the intermediate wall $c$ is the same length as $b'$, while the space between walls $b$ and $c$ is greater than the space between walls $b'$ and $c$, the reasons for all of which will appear hereinafter. The edge $d$ of wall $b'$ of each bracket 10 is provided with a notch 11 near its outer end for receiving a pin 12 projecting from one spoke of a pair of spokes 13, 13 pivotally connected together scissors-like at an intermediate point by a pivot pin 14. The other spoke 13 also has a pin 15 projecting from its lower end for entering a slot 16 in wall $e$ of a bracket 10', which is one of a series secured to the inner surface of a plate 17 adapted to cooperate with the spoke case 5 for enclosing the spokes 13. The plate 17 is provided with a central opening 18 around which is disposed a ring 18' for sliding over the hub H and fitting against the ring 7 when the spokes 13, 13 are closed (which is their normal position, Fig. 2).

It will be observed that when the spokes are closed (Figs. 2 and 5) their inner ends will lie snugly against each other and be tightly confined between wall $b'$ of bracket 10 and wall $e$ of bracket 10', said brackets being in interlocking relation. The space between walls $b$ and $c$ of bracket 10 receives connected walls $e$ and $f$ of bracket 10' and the space between walls $f$ and $g$ of bracket 10' receives connected walls $b'$ and $c$ of bracket 10.

The pneumatic tire T for the wheel is substantially the same as that of my Patent No. 1,162,749 heretofore referred to, and consists of an outer casing 19 and an inner casing 20, the beads 19' and 20' respectively of which are secured to lateral felloe rims 21, 21 by bolts 22. The outer ends of spokes 13, 13 of each pair fork outwardly, and suitable seats 23, 23 are formed on the extremities of the spokes to receive the felloe rims 21, 21. Thus the tire T is firmly wedged and clamped by the spoke seats 23, 23 spaced entirely around its periphery and held against movement, while at the same time it is yielding in every direction thus providing resilience and cushioning effect greatly in excess of those tires which are not expansible toward the wheel center.

In order to hold the spokes in closed position a hub nut 24 is screwed over the hub threads $t$ and a peripheral shoulder 25 formed on the nut engages a flange 26 projecting outwardly from plate 17, thus holding the spokes, and, of course, the brackets 10, 10′ securely together.

When it is necessary to remove a tire, the hub nut 24 is first removed after which a suitable tool (not shown) is screwed into threads $t'$ on the inside of flange 26, and by a proper manipulation of this tool the plate 17 is forced to separate from spoke case 5, and the spokes that are connected to brackets 10′ on plate 17 are pulled away from the others and the spokes are opened scissors-like. As the spokes of each pair are opened they are drawn inwardly toward the center of the wheel (Fig. 3) and the tire may be lifted from them and a new tire mounted in its place.

Reversely, as the spokes are expanded their ends will be securely wedged against the inner rim, or rims, of the tire.

It will be apparent that the lever arms of the spokes between the pivotal point and their outer ends will permit of a certain degree of resiliency and will yield slightly when the tire is subjected to sudden shocks, thus increasing the cushioning effect of the tire which expands with the outward movement of the spokes.

If desired, my improved wheel may also be used with the present standard type of tire and rim, although with not the same advantage as when the tire shown in my Patent No. 1,162,749 is used with my improved wheel.

Having described my invention, I claim:

1. A vehicle wheel comprising a hub, a series of spokes arranged in pairs around said hub, the spokes of each pair being pivotally secured together intermediate their extremities, the outer ends of said spokes terminating in suitable felloe receiving formations, felloe rims positioned on said formations, a tire mounted on said felloe rims, corresponding spokes of each pair being secured to the hub, and the other spokes of said pair being removably positioned over said hub.

2. A vehicle wheel comprising a hub, a series of spokes arranged in pairs around said hub, the spokes of each pair being pivotally secured together intermediate their extremities, the outer ends of said spokes terminating in suitable felloe receiving formations, felloe rims positioned on said formations, a tire mounted on said felloe rims, corresponding spokes of each pair being secured to the hub, and the other spokes of each pair being removably positioned over said hub, and means for withdrawing the last mentioned spokes from the hub.

3. A vehicle wheel comprising a hub, a series of spokes arranged in pairs around said hub, the spokes of each pair being pivotally secured together intermediate their extremities, the outer ends of said spokes terminating in suitable felloe receiving formations, felloe rims positioned on said formations, a tire mounted on said felloe rims, corresponding spokes of each pair being secured to the hub, and the other spokes of each pair being removably positioned over said hub, and means for holding said last mentioned spokes against movement while on the hub.

4. A vehicle wheel comprising a hub, a series of spokes arranged in pairs around said hub, the spokes of each pair being pivotally secured together intermediate their extremities and having said extremities located on opposite sides of a medial plane parallel to the plane of rotation of the wheel, a pair of felloe rims mounted on the outer ends of said spokes, a tire mounted on said rims, a plurality of anchor brackets secured on and arranged around said hub, corresponding spokes of said pairs being connected to said brackets, a plate removably positioned over said hub, a plurality of anchor brackets secured on said plate and the other spokes of said pairs being connected to said last mentioned brackets, the brackets on the hub being adapted to interlock with those on the plate when the latter is positioned over the hub.

5. A vehicle wheel comprising a hub, a series of spokes arranged in pairs around said hub, the spokes of each pair being pivotally secured together intermediate their extremities, and having said extremities located on opposite sides of a medial plane parallel to the plane of rotation of the wheel, a pair of felloe rims mounted on the outer ends of said spokes and a tire mounted on said rims.

6. A vehicle wheel comprising a hub, a series of spokes arranged in pairs around said hub, the spokes of each pair being pivotally secured together intermediate their extremities, and having said extremities located on opposite sides of a medial plane parallel to the plane of rotation of the wheel, felloe rims mounted on the outer ends of said spokes, a tire mounted on the felloe rims and means for wedging the outer extremities of the spokes against the inner surface of said tire.

7. A vehicle wheel comprising a hub, a series of spokes arranged in pairs around said hub, the spokes of each pair being pivotally secured together intermediate their extremities, and having said extremities located on opposite sides of a medial plane parallel to the plane of rotation of the wheel, a pair of spaced felloe rims mounted on the outer ends of said spokes, means for wedging the outer extremities of the spokes against the felloe rims, and a pneumatic tire mounted on said rims.

In testimony whereof I hereunto affix my signature.

WILLIAM H. BURRITT.